(12) United States Patent
Zhou

(10) Patent No.: US 10,936,595 B2
(45) Date of Patent: Mar. 2, 2021

(54) DEFERRING AND/OR ELIMINATING DECOMPRESSING DATABASE DATA

(71) Applicant: SYBASE, INC., Dublin, CA (US)

(72) Inventor: Xiao Ming Zhou, Singapore (SG)

(73) Assignee: SYBASE, INC., Dublin, CA (US)

( * ) Notice: Subject to any disclaimer, the term of this patent is extended or adjusted under 35 U.S.C. 154(b) by 258 days.

(21) Appl. No.: 14/244,565

(22) Filed: Apr. 3, 2014

(65) Prior Publication Data

US 2015/0286683 A1  Oct. 8, 2015

(51) Int. Cl.
*G06F 16/30* (2019.01)
*G06F 16/2455* (2019.01)

(52) U.S. Cl.
CPC .... *G06F 16/24561* (2019.01); *G06F 16/2456* (2019.01)

(58) Field of Classification Search
CPC ................................................. G06F 17/30501
USPC ......................................................... 707/639
See application file for complete search history.

(56) References Cited

U.S. PATENT DOCUMENTS

| | | | | |
|---|---|---|---|---|
| 9,171,041 B1* | 10/2015 | Narayanan | ........ | G06F 17/30463 |
| 2003/0074364 A1* | 4/2003 | Sewall | ............ | G06F 17/30321 |
| 2010/0049730 A1* | 2/2010 | Qiao | ...................... | G06Q 40/00 707/756 |
| 2010/0082648 A1* | 4/2010 | Potapov | ................ | G06F 3/0611 707/756 |
| 2010/0088309 A1* | 4/2010 | Petculescu | ........... | G06F 16/221 707/714 |
| 2010/0161650 A1* | 6/2010 | Chaitanya | ......... | G06F 16/24552 707/769 |
| 2010/0325094 A1* | 12/2010 | Yang | .................. | G06F 17/30312 707/693 |
| 2011/0040771 A1* | 2/2011 | Gilyadov | ................ | G06F 13/00 707/754 |
| 2011/0131199 A1* | 6/2011 | Simon | ............... | G06F 17/30463 707/714 |
| 2012/0078860 A1* | 3/2012 | Roberts | ............ | G06F 17/30501 707/693 |
| 2012/0323929 A1* | 12/2012 | Kimura | ............... | G06F 16/2282 707/748 |
| 2014/0074805 A1* | 3/2014 | Kapoor | ............ | G06F 16/24561 707/693 |
| 2014/0095517 A1* | 4/2014 | Marwah | ............ | G06F 17/30501 707/754 |

* cited by examiner

*Primary Examiner* — Mahesh H Dwivedi
(74) *Attorney, Agent, or Firm* — Sterne, Kessler, Goldstein & Fox P.L.L.C.

(57) ABSTRACT

Disclosed herein are system, method, and computer program product embodiments for deferring or eliminating a need to decompress database data. An embodiment operates by decompressing a column of a database. The column may be represented by a predicate of a query. A row of the database may be determined to satisfy the predicate based on decompressed information from the column. Decompression of an additional column of the row may be deferred during execution the query until the row is determined to satisfy the predicate. The additional column may satisfy the query.

16 Claims, 4 Drawing Sheets

DEFERRING AND/OR ELIMINATING DECOMPRESSING DATABASE DATA

BACKGROUND

Commercial database systems rely on compression techniques to reduce the amount of space required to store data in a database. Yet, for many operations used by database systems, handling compressed information is much more computationally expensive than handling uncompressed information. The computational costs increase significantly when processing large amounts of data, in which more data is decompressed. However, there are many times when computational resources are wasted decompressing data that is ultimately not used for producing a desired result.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for deferring or eliminating decompression of database data.

Figure 1:
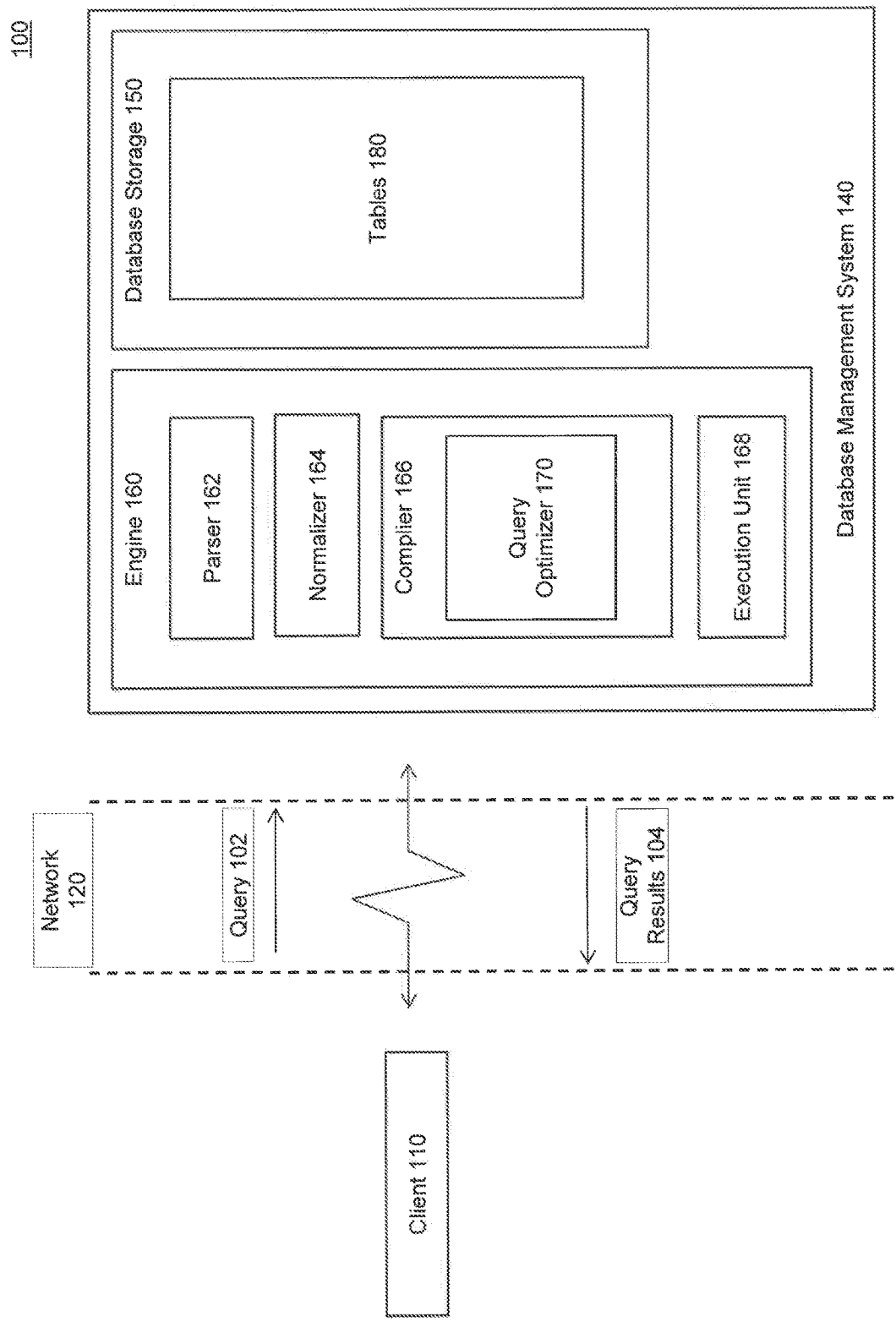
FIG. 1 is a block diagram of a database system, according to an example embodiment.

FIG. 1 is a block diagram of a database system 100 for deferring or eliminating decompression of database data, according to an example embodiment. Database system 100 includes a database management system (DBMS) 140 and client 110 that communicates DBMS 140. DBMS 140 can be a system executing on a server and accessible to client 110 over a network, such as network 120, described below. Although client 110 is represented in FIG. 1 as a separate physical machine from DBMS 140, this is presented by way of example, and not limitation. In an additional embodiment, client 110 occupies the same physical system as DBMS 140. In a further embodiment, client 110 is a software application which requires access to DBMS 140. Client 110 can request access to DBMS 140. Additionally, both client 110 and DBMS 140 can execute within a computer system, such as an example computer system discussed in FIG. 4.

Client 110 and DBMS 140 can communicate over network 120. Network 120 can be any network or combination of networks that can carry data communications. Such a network 120 can include, but is not limited to, a local area network, metropolitan area network, and/or wide area network that include the Internet.

A relational database is a collection of data items organized as a set of formally-described tables from which data can be accessed or reassembled in many different ways without having to reorganize the database tables. A relational database employs a set of tables containing data fitted into predefined categories.

Each table itself comprises one or more rows or records (tuples). A database can contain many tables, each of which stores information. A table in a relational database can contain, for example, anywhere from a few rows to millions of rows. A row is divided into fields or columns; each field or column represents one particular attribute of the given row. A row corresponding to an employee record, for example, may include information about the employee's ID Number, Last Name and First Initial, Position, Date Hired, Social Security Number, and Salary. Each of these categories, in turn, represents a database field or column. In the foregoing employee table, for example, Position is one column, Date Hired is another, and so on. With this format, tables are easy for users (e.g., system administrators) to understand and use. Moreover, the flexibility of tables permits a user to define relationships between various items of data, as needed. Thus, a record can include several categories of information, for example, about an individual person, place, or thing. Each row in a table is uniquely identified by a record identifier or row identifier ("IUD"), which can be used as a pointer to a given row.

DBMS 140 receives a query, such as query 102, from client 110. Query 102 is used to request, modify, append, or otherwise manipulate or access data in database storage 150. Query 102 is transmitted to DBMS 140 by client 110 using syntax which conforms to a query language. In a non-limiting embodiment, the query language is a Structured Query Language ("SQL"), but can be another query language. DBMS 140 is able to interpret query 102 in accordance with the query language and based on the interpretation, generate requests to database storage 150.

Query 102 can be generated by a user using client 110 or by an application executing on client 110. Upon receipt, DBMS 140 begins to process query 102. Once processed, the result of the processed query is transmitted to client 110 as query result 104.

In an embodiment, query 102 also contains a predicate. A predicate is a condition that may be evaluated in query 102. In an embodiment, a predicate is a join predicate. A join predicate is a predicate that specifies a join operation that links several tables together on a particular set of attributes when evaluated. An evaluated join predicate returns a join table as a result. A join can comprise an inner join, an outer join, a nested join, a merge join, or any combination thereof. A RID Join accepts one or more row identifiers and one or more columns and returns the columns of the rows that correspond to the identifiers.

In an embodiment, a column is represented by a predicate of query 102. A column represented by a predicate of query 102 can apply to one or more rows of the database and contain a value used to evaluate the predicate. The column can be represented explicitly, for example, by being referenced in the predicate, or implicitly, e.g. as a result of one or more operations performed on the predicate to identify the column.

In an embodiment, the rows and/or columns are stored in one or more of tables 180. Any combination of the rows and/or columns of tables 180 can be stored compressed or uncompressed in tables 180. That data in tables 180 can be compressed using row compression, page-dictionary compression, page-index compression, column compression, or any combination thereof. Compressed rows and/or columns of tables 180 can each be compressed with different compression types.

In an embodiment, query 102 includes one or more sub-queries. A sub-query is a query included within another query. Any sub-query may comprise one or more sub-queries.

To process query 102, DBMS 140 includes engine 160, which includes a parser 162, a normalizer 164, a compiler 166, and an execution unit 168.

Parser 162 parses the received queries 102. In an embodiment, parser 162 converts query 102 into a binary tree data structure which represents the format of query 102. In other embodiments, other types of data structures are used.

When parsing is complete, parser 162 passes the parsed query to a normalizer 164. Normalizer 164 normalizes the parsed query. For example, normalizer 164 eliminates redundant SQL constructs from the parsed query. Normalizer 164 also performs error checking on the parsed query that confirms that the names of the tables in the parsed query conform to the names of tables 180. Normalizer 164 also confirms that relationships among tables 180, as described by the parsed query, are valid.

Once normalization is complete, normalizer 164 passes the normalized query to compiler 166. Compiler 166 compiles the normalized query into machine-readable format. The compilation process determines how query 102 is executed by DBMS 140. To ensure that query 102 is executed efficiently, compiler 166 uses a query optimizer 170 to generate a query plan for executing the query. Execution unit 168 receives the query plan and executes it to produce query results 104.

Query optimizer 170 analyzes the query and determines a query plan for executing the query. The query plan retrieves and manipulates information in the database storage 150 in accordance with the query semantics. This can include choosing the access method for each table accessed, choosing the order in which to perform a join operation on the tables, and choosing the join method to be used in each join operation. As there can be multiple strategies for executing a given query using combinations of these operations, query optimizer 170 generates and evaluates a number of strategies from which to select the best strategy to execute the query.

In an embodiment, query optimizer 170 generates multiple query plans. Once generated, query optimizer 170 selects a query plan from the multiple query plans to execute the query. The selected query plan may be a cost efficient plan, a query plan that uses the least amount of memory in DBMS 140, a query plan that executes the quickest, or any combination of the above, to give a few examples. In an embodiment, the selected query plan may be the query plan that invokes the least Input/Output accesses, which may be executed the fastest, particularly when the Input/Output accesses involve compression and decompression operations. For example, query optimizer 170 may generate a query that instructs execution unit 168 to execute a query in accordance with the method depicted in FIG. 2.

Figure 2:
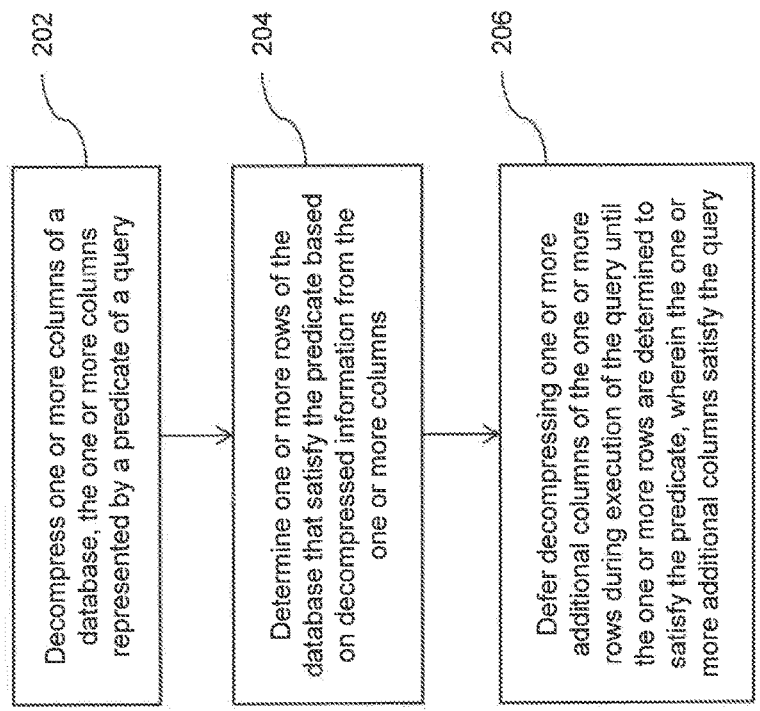
FIG. 2 is a flowchart illustrating a method for deferring or eliminating a need to decompress database data, according to an example embodiment.

FIG. 2 is a flowchart for a method 200 for deferring and/or eliminating decompression of database data, according to an embodiment. Method 200 can be performed by processing logic that can comprise hardware (e.g., circuitry, dedicated logic, programmable logic, microcode, etc.), software (e.g., instructions run on a processing device), or a combination thereof. For example, method 200 may be performed by engine 168 in FIG. 1.

Method 200 of FIG. 2 will be described in conjunction with the example query plan 300 depicted in FIG. 3.

Figure 3:
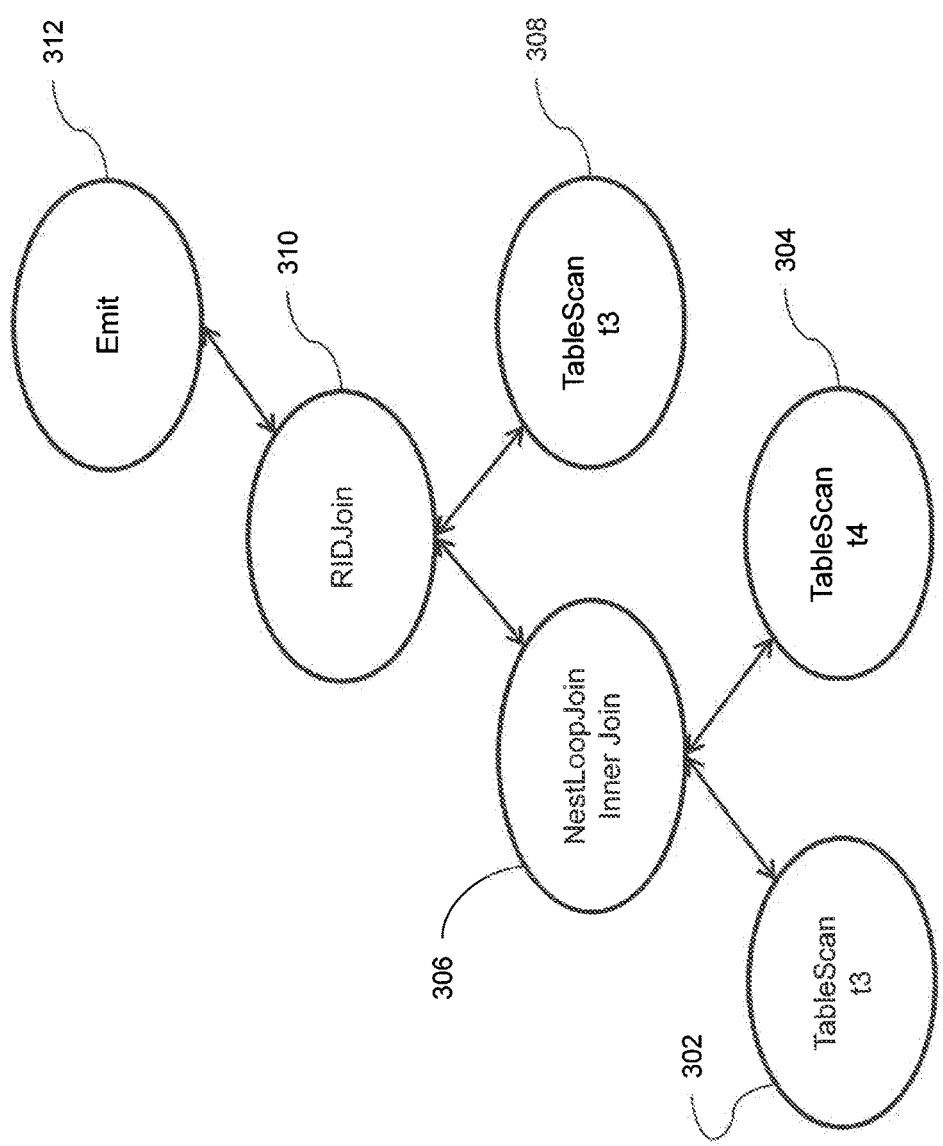
FIG. 3 is a diagram of an example query plan, according to an embodiment.

FIG. 3 is a diagram of an example query plan 300, according to an embodiment. In an embodiment, query optimizer 170 may generate query plan 300. Query plan 300 can include table scan operations 302, 304, and 308, NestLoopJoin/Inner Join operation 306, RID Join operation 310, and emit operation 312. A NestLoopJoin/Inner Join operation is a type of join that uses a nested loop to perform an inner join.

Query plan 300 may be generated from the following example query, Query 1:

Query 1: SELECT t3.* from t3, t4 where t3.c1=t4.c1

Query 1 includes a join operation. For purposes of illustration, example query plan 300 is applied to an example database having tables t3 and t4. Table t3 has 30 columns (t3.c1-t3.c30) and table t4 has 20 columns (t4.c1-t4.c20), all of which are compressed. Tables t3 and t4 may each have several rows, for example, 10,000 or more rows.

Referring back to FIG. 2, at block 202, one or more columns of a database are decompressed. In an embodiment, block 202 is performed by execution unit 168 in FIG. 1. In an embodiment, the columns to be decompressed are determined by a predicate of query 102. For example, Query 1 includes two columns represented by the predicate: t3.c1 and t4.c1. Referring to FIG. 3, executing table scan operations 302 and 304 will decompress columns t3.c1 and t4.c1 for each of the rows in t3 and t4, respectively, in order to access the values stored therein.

Referring back to FIG. 2, at block 204 one or more rows of the database are determined to satisfy the predicate based on the decompressed information from the columns. In an embodiment, block 204 is performed by execution unit 168. The rows may be identified by corresponding row identifiers. The row identifiers can be compressed or uncompressed. In an embodiment, a row identifier is an index.

Determining that a row of the database satisfies the predicate based on decompressed information from the one or more columns can be accomplished using one or more approaches. In an embodiment, the determining is performed, all or in part, by executing one or more joins, one or more sub-queries, or any combination thereof. The one or more joins, one or more sub-queries, or any combination thereof may operate on any number of tables, for example, two tables, three tables, ten tables, fifty tables, etc.

For example, in FIG. 3, NestLoopJoin/Inner Join operation 306, when executed, will execute a join that identifies all of the rows of table t3 and table t4 in which the decompressed values of column t3.c1 equal the decompressed values of column t4.c1. These identified rows are referred to in this example as join result rows. The join result rows can be identified by row identifiers.

Referring back to FIG. 2, at block 206, decompressing one or more additional columns of the one or more rows may be deferred during execution of the query until the row is determined to satisfy the query. The additional column may satisfy the query. In an embodiment, block 206 is performed by execution unit 168.

For example, Query 1 specifies that all of the columns of t3 (as specified by the expression "t3.*") of the join result rows are to be returned in a resulting join table. However, at this point, columns t3.c2-t3.c30 of the join result rows have not yet been decompressed. Thus, the decompression of columns t3.c2-t3.c30 of the join result rows has been deferred until the join result rows have been determined to satisfy Query 1. For example, in FIG. 3, RID Join operator 310, When executed, performs a RID join on the join result rows to return the requested columns t3.c1-t3.c30. To retrieve the values in columns t3.c2-t3.c30, RID Join operator 310 can call table scan operator 308 on these columns. Table scan operator 308, when executed, decompresses columns t3.c2-t3.c30 of the join result rows. Although columns t3.c2-t3.c30 for all of the rows in table t3 could have been decompressed at earlier in the query, such as by table scan operator 302, deferring decompression until the join result rows have been identified avoids decompressing columns t3.c2-t3.c30 of rows not returned by the execution of NestLoopJoin/Inner Join operation 306. By identifying the join result rows prior to decompressing any additional columns, the need to decompress data in columns that do not correspond to the join result rows is eliminated. This saves computational resources from being expended on decompressing columns that are not of interest and will not be returned as a part of a query result. Emit operation 312, when executed, may forward the resulting join table produced by RID Join operator as a query result (e.g. query results 104).

Referring back to FIG. 2, method 200 can incorporate several other features or modifications. In an embodiment, these other features or modifications are performed by execution unit 168. For example, the decompression can be deferred until one or more values of the one or more additional columns are used, such as when one or more of several other operations (e.g. other joins, sub-queries, table scans, etc.) occur prior to using the values (e.g. including the value in query results 104) In this example, decompressing the one or more additional columns may be deferred until preforming a table scan to build the query results 104, which occurs several other operations after the join result rows have be been identified. Deferring decompression can include modifying a query plan to eliminate decompression of a compressed column of another row of the database that does not satisfy the predicate. For example, a query plan may be modified to remove consideration of any columns that are not represented by a predicate of a query, such as by modifying the projection, predicate, and substitution lists of the query plan to remove reference to those columns. Thus, the decompression of the columns that are not represented by the predicate of the query and that also do not satisfy the query will have been eliminated from the query plan for the sub-tree under NestLoopJoin/Inner Join operation 306.

In an embodiment, query optimizer 170 may modify a query plan to eliminate decompression of a compressed column of another row of the database that does not satisfy the predicate. Query optimizer can eliminate decompression by deferring consideration of the one or more additional columns to later in the query plan. This occurs prior to execution of a query plan by execution unit 168. The effect of modifying the query plan to defer accessing the one or more additional columns, as shown above in the example provided by FIG. 3, is to remove the one or more additional columns of certain rows from being decompressed, such as by having them be filtered out by the join operation. Because the rows are not returned, their being considered later, according to the structure of the query plan, effectively eliminates the one or more additional columns of non-returned rows from being decompressed. In another example, the one or more columns that are decompressed, for example, at block 202, and the one or more additional columns that are decompressed, for example, at block 206, may employ different compression types. The different compression types can include at least one of row compression, page-dictionary compression, page-index compression, column compression, or any combination thereof.

Figure 4:
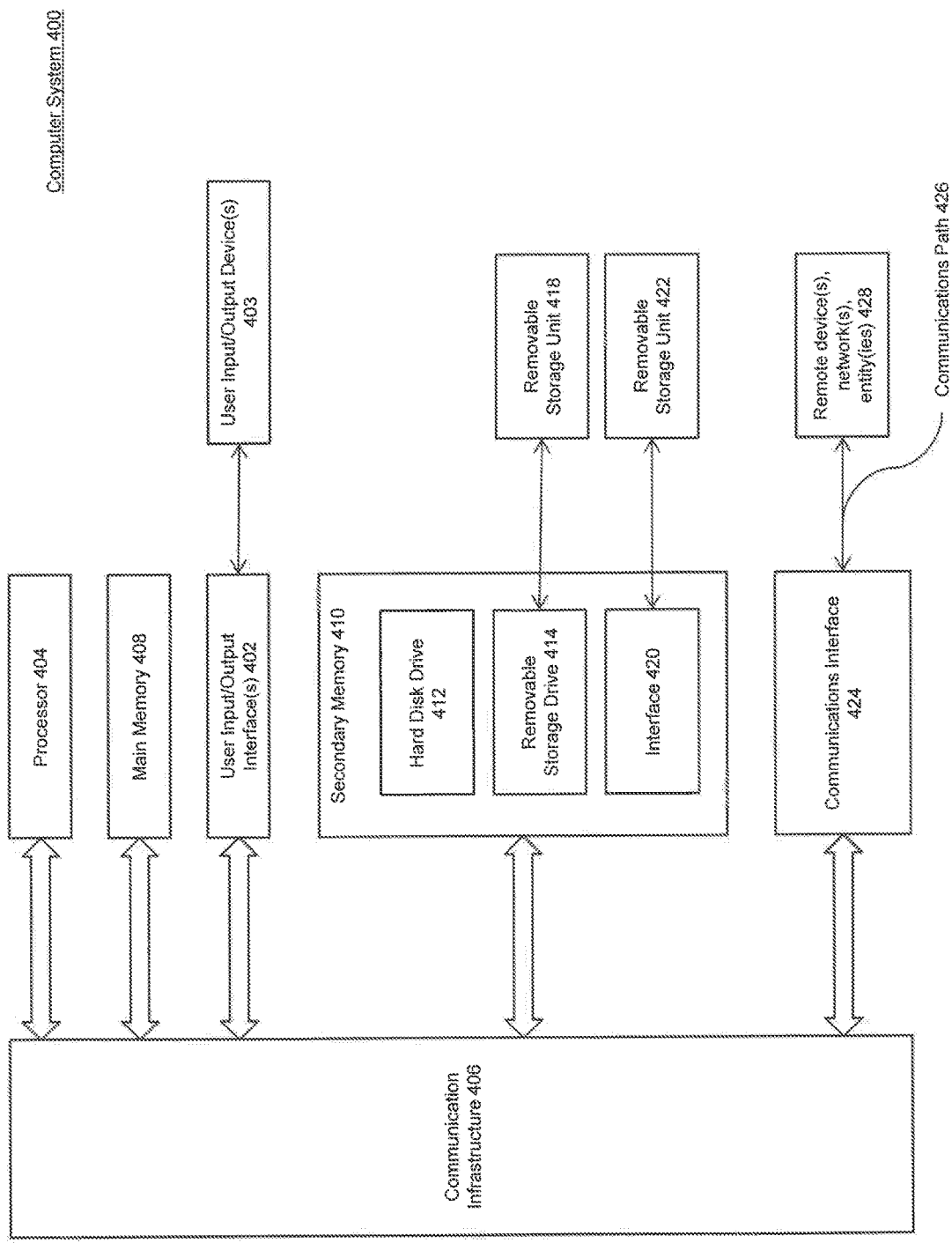
FIG. 4 is an example computer system useful for implementing various embodiments.

Various embodiments can be implemented, for example, using one or more computer systems, such as computer system 400 shown in FIG. 4. Computer system 400 can be any computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
    executing a join operation between a first table and a second table, wherein a decompressed column of the first table is matched with a decompressed column of the second table, wherein the join operation produces a join table;
    decompressing, by at least one processor according to a query plan, a selected column of the join table, the selected column represented by a first predicate of a query;
    determining, by the at least one processor according to the query plan, that a row of the join table satisfies the first predicate based on the decompressed information from join table and the decompressed information from the selected column;
    determining that a second predicate of the query comprises an evaluation against data of the decompressed column and one or more compressed columns of the join table, wherein the decompressed column employs page-index compression and a first one of the compressed columns employ page-dictionary compression; and
    modifying, by the at least one processor, the query plan so as to evaluate the second predicate on the decompressed column of the row, defer decompressing the one or compressed columns of the row during execution of the query until the decompressed column of the row is determined to satisfy the second predicate, and eliminate decompression of one of the compressed columns of another row of the database, wherein the other row does not satisfy the predicate.

2. The method of claim 1, further comprising:
    decompressing a first one of the compressed columns after the row is determined to satisfy the predicate, wherein the predicate is a join predicate that specifies a join operation that links a plurality of tables based on a particular set of attributes.

3. The method of claim 1, the determining further comprising:
    executing a join using the decompressed information from the column to determine that the row satisfies the predicate.

4. The method of claim 1, the determining further comprising:
    executing a sub-query using the decompressed information from the column to determine that the row satisfies the predicate.

5. The method of claim 1, the modifying further comprising:
    removing reference to the additional column from projection, predicate, and substitution lists of the query plan.

6. The method of claim 1, wherein decompression of the additional column is deferred until performing a table scan to build query results according to the query plan, the query results comprising the additional column.

7. The method of claim 1, wherein the modifying the query plan to eliminate the decompression is performed after the deferring of the decompression.

8. The method of claim 3, wherein executing the join comprises:
    identifying a join result of a plurality of rows, including the determined row, that satisfy the predicate, wherein at least one column of the database that does not correspond to the join result rows is not decompressed based on the deferring.

9. The method of claim 3, wherein one or more of the compressed columns are not decompressed based on the execution of the join.

10. A system, comprising:
a memory; and
at least one processor coupled to the memory and configured to:
   executing a join operation between a first table and a second table, wherein a decompressed column of the first table is matched with a decompressed column of the second table, wherein the join operation produces a join table
   decompress a selected column of the join table, the selected column represented by a first predicate of a query;
   determine, according to the query plan, that a row of the join table satisfies the first predicate based on the decompressed information from join table and the decompressed information from the selected column;
   determine that a second predicate of the query comprises an evaluation against data of the decompressed column and one or more compressed columns of the join table, wherein the decompressed column employs page-index compression and a first one of the compressed columns employ page-dictionary compression; and
   modify the query plan so as to evaluate the second predicate on the decompressed column of the row, defer decompressing the one or compressed columns of the row during execution of the query until the decompressed column of the row is determined to satisfy the second predicate, and eliminate decompression of one of the compressed columns of another row of the database, wherein the other row does not satisfy the predicate.

11. The system of claim 10, the at least one processor further configured to:
   decompress a first one of the compressed columns after the row is determined to satisfy the predicate.

12. The system of claim 10, wherein to determine that the row of the database satisfies the predicate the at least one processor is configured to:
   execute a join using the decompressed information from the column to determine that the row satisfies the predicate.

13. The system of claim 10, wherein to determine that the row of the database satisfies the predicate the at least one processor is configured to:
   execute a sub-query using the decompressed information from the column to determine that the row satisfies the predicate.

14. A non-transitory computer-readable device having instructions stored thereon that, when executed by at least one computing device, causes the at least one computing device to perform operations comprising:
   executing a join operation between a first table and a second table, wherein a decompressed column of the first table is matched with a decompressed column of the second table, wherein the join operation produces a join table; 0034
   decompressing, by at least one processor according to a query plan, a selected column of the join table, the selected column represented by a first predicate of a query;
   determining, by the at least one processor according to the query plan, that a row of the join table satisfies the first predicate based on the decompressed information from join table and the decompressed information from the selected column;
   determining that a second predicate of the query comprises an evaluation against data of the decompressed column and one or more compressed columns of the join table, wherein the decompressed column employs page-index compression and a first one of the compressed columns employ page-dictionary compression; and
   modifying, by the at least one processor, the query plan so as to evaluate the second predicate on the decompressed column of the row, defer decompressing the one or compressed columns of the row during execution of the query until the decompressed column of the row is determined to satisfy the second predicate, and eliminate decompression of one of the compressed columns of another row of the database, wherein the other row does not satisfy the predicate.

15. The computer-readable device of claim 14, the operations further comprising:
   decompressing a first one of the compressed columns after the row identifiers are determined to satisfy the predicate.

16. The computer-readable device of claim 14, the determining comprising:
   executing a join using the decompressed information from the column to determine that the row satisfies the predicate.

* * * * *